(12) United States Patent
Johnsen et al.

(10) Patent No.: US 9,893,977 B2
(45) Date of Patent: *Feb. 13, 2018

(54) SYSTEM AND METHOD FOR SUPPORTING LIVE MIGRATION OF VIRTUAL MACHINES IN A VIRTUALIZATION ENVIRONMENT

(71) Applicant: Oracle International Corporation, Redwood Shores, CA (US)

(72) Inventors: Bjørn Dag Johnsen, Oslo (NO); Wei Lin Guay, Penang (MY)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/268,835

(22) Filed: Sep. 19, 2016

(65) Prior Publication Data
US 2017/0005908 A1    Jan. 5, 2017

Related U.S. Application Data

(63) Continuation of application No. 13/838,121, filed on Mar. 15, 2013, now Pat. No. 9,450,885.
(Continued)

(51) Int. Cl.
*G06F 15/167* (2006.01)
*H04L 12/751* (2013.01)
(Continued)

(52) U.S. Cl.
CPC .......... *H04L 45/02* (2013.01); *G06F 9/45533* (2013.01); *G06F 9/45558* (2013.01);
(Continued)

(58) Field of Classification Search
CPC ............ G06F 9/45533; G06F 9/45558; G06F 9/4856; G06F 15/17331; H04L 41/0806;
(Continued)

(56) References Cited

U.S. PATENT DOCUMENTS 6,055,532 A    4/2000  Soeder
7,398,394 B1   7/2008  Johnsen
(Continued)

FOREIGN PATENT DOCUMENTS

CN    101809943    8/2010
CN    102209024    10/2011
(Continued)

OTHER PUBLICATIONS

United States Patent and Trademark Office, Notice of Allowance and Fee(s) Due dated Mar. 27, 2017 for U.S. Appl. No. 14/848,109, 14 Pages.
(Continued)

*Primary Examiner* — Anthony Mejia
*Assistant Examiner* — Binod J Kunwar
(74) *Attorney, Agent, or Firm* — Tucker Ellis LLP

(57) ABSTRACT

A system and method can support virtual machine live migration in a network. A virtual switch can be associated with a plurality of virtual functions (VFs), and wherein each said virtual function (VF) is associated with a separate virtual interface (VI) space. At least one virtual machine that is attached with a said virtual function (VF) can be associated with a virtual interface (VI), e.g. a queue pair (QP) in an Infiniband (IB) architecture. Furthermore, said at least one virtual machine operates to perform a live migration from a first host to a second host with said virtual function (VF) attached.

20 Claims, 11 Drawing Sheets

Related U.S. Application Data

(60) Provisional application No. 61/615,731, filed on Mar. 26, 2012.

(51) Int. Cl.

| | |
|---|---|
| H04L 12/917 | (2013.01) |
| H04L 12/931 | (2013.01) |
| G06F 9/455 | (2006.01) |
| G06F 9/48 | (2006.01) |
| G06F 15/173 | (2006.01) |
| H04L 12/24 | (2006.01) |
| H04L 12/715 | (2013.01) |
| H04L 29/08 | (2006.01) |

(52) U.S. Cl.
CPC ...... *G06F 9/4856* (2013.01); *G06F 15/17331* (2013.01); *H04L 41/0806* (2013.01); *H04L 45/64* (2013.01); *H04L 47/76* (2013.01); *H04L 49/358* (2013.01); *H04L 49/70* (2013.01); *H04L 67/1002* (2013.01); *G06F 2009/4557* (2013.01)

(58) Field of Classification Search
CPC ....... H04L 45/64; H04L 47/76; H04L 49/358; H04L 49/70; H04L 67/1002
USPC .................................. 709/212, 226; 710/316
See application file for complete search history.

(56) References Cited

U.S. PATENT DOCUMENTS

| | | | |
|---|---|---|---|
| 7,493,409 B2 | 2/2009 | Craddock | |
| 7,970,913 B2 | 6/2011 | Machulsky | |
| 7,983,265 B1 | 7/2011 | Dropps | |
| 8,150,971 B2* | 4/2012 | Lublin | G06F 15/16 709/226 |
| 8,331,381 B2 | 12/2012 | Brown | |
| 8,335,909 B2 | 12/2012 | Ballew | |
| 8,341,327 B2* | 12/2012 | Baba | G06F 13/387 710/315 |
| 8,429,304 B2 | 4/2013 | Shima | |
| 8,429,647 B2* | 4/2013 | Zhou | G06F 9/4856 709/220 |
| 8,739,273 B2 | 5/2014 | Johnsen | |
| 9,135,097 B2 | 9/2015 | Sridharan | |
| 9,304,798 B2 | 4/2016 | Mudigonda | |
| 9,311,122 B2 | 4/2016 | Guay | |
| 9,330,102 B2 | 5/2016 | McGrath | |
| 9,397,946 B1 | 7/2016 | Yadav | |
| 9,507,619 B2 | 11/2016 | Bauman | |
| 9,584,605 B2 | 2/2017 | Johnsen | |
| 2003/0061379 A1 | 3/2003 | Craddock | |
| 2003/0120852 A1 | 6/2003 | McConnell | |
| 2003/0208572 A1 | 11/2003 | Shah | |
| 2005/0100033 A1* | 5/2005 | Arndt | H04L 67/1097 370/412 |
| 2005/0120160 A1 | 6/2005 | Plouffe | |
| 2005/0286511 A1 | 12/2005 | Johnsen | |
| 2006/0230185 A1* | 10/2006 | Errickson | H04L 49/35 709/250 |
| 2008/0186990 A1 | 8/2008 | Abali | |
| 2008/0189432 A1* | 8/2008 | Abali | G06F 9/4856 709/238 |
| 2009/0055831 A1 | 2/2009 | Bauman | |
| 2009/0077268 A1 | 3/2009 | Craddock | |
| 2009/0260083 A1 | 10/2009 | Szeto | |
| 2010/0036913 A1 | 2/2010 | Imai | |
| 2010/0037309 A1 | 2/2010 | Dargis | |
| 2010/0125855 A1 | 5/2010 | Ferwerda | |
| 2010/0169494 A1* | 7/2010 | Machulsky | H04L 69/162 709/227 |
| 2010/0257269 A1* | 10/2010 | Clark | G06F 9/4856 709/226 |
| 2010/0287548 A1* | 11/2010 | Zhou | G06F 9/4856 718/1 |
| 2010/0306381 A1 | 12/2010 | Lublin | |
| 2011/0145819 A1 | 6/2011 | McKenzie | |
| 2011/0145820 A1 | 6/2011 | Pratt | |
| 2011/0145821 A1 | 6/2011 | Philipson | |
| 2011/0145916 A1 | 6/2011 | McKenzie | |
| 2011/0154318 A1 | 6/2011 | Oshins | |
| 2011/0246669 A1* | 10/2011 | Kanada | G06F 9/4856 709/238 |
| 2012/0042034 A1* | 2/2012 | Goggin | G06F 9/4856 709/216 |
| 2012/0173757 A1* | 7/2012 | Sanden | G06F 9/45558 709/238 |
| 2012/0284786 A1 | 11/2012 | Somani | |
| 2012/0287931 A1* | 11/2012 | Kidambi | H04L 49/602 370/392 |
| 2012/0311333 A1 | 12/2012 | Johnsen | |
| 2012/0311670 A1 | 12/2012 | Johnsen | |
| 2012/0311682 A1 | 12/2012 | Johnsen | |
| 2013/0019277 A1 | 1/2013 | Chang | |
| 2013/0019302 A1 | 1/2013 | Johnsen | |
| 2013/0091534 A1 | 4/2013 | Gilde | |
| 2013/0151685 A1 | 6/2013 | Bursell | |
| 2013/0205376 A1 | 8/2013 | Narasimha | |
| 2013/0227561 A1 | 8/2013 | Walsh | |
| 2013/0254321 A1 | 9/2013 | Johnsen | |
| 2013/0254368 A1 | 9/2013 | Guay | |
| 2013/0254404 A1 | 9/2013 | Johnsen | |
| 2013/0254766 A1 | 9/2013 | Zuo | |
| 2013/0259033 A1 | 10/2013 | Hefty | |
| 2013/0298183 A1 | 11/2013 | McGrath | |
| 2013/0318341 A1 | 11/2013 | Bagepalli | |
| 2013/0332982 A1 | 12/2013 | Rao | |
| 2014/0047441 A1 | 2/2014 | Miyauchi | |
| 2014/0052877 A1 | 2/2014 | Mao | |
| 2014/0068258 A1 | 3/2014 | Chao | |
| 2014/0177629 A1 | 6/2014 | Manula | |
| 2014/0219287 A1 | 8/2014 | Birke | |
| 2014/0289792 A1 | 9/2014 | Fry | |
| 2014/0317716 A1 | 10/2014 | Chao | |
| 2014/0344436 A1 | 11/2014 | Madani | |
| 2014/0351423 A1 | 11/2014 | Madani | |
| 2014/0351920 A1 | 11/2014 | Madani | |
| 2014/0351921 A1 | 11/2014 | Madani | |
| 2014/0351922 A1 | 11/2014 | Madani | |
| 2014/0351923 A1 | 11/2014 | Madani | |
| 2015/0012962 A1 | 1/2015 | Walsh | |
| 2015/0026332 A1 | 1/2015 | Madani | |
| 2015/0066759 A1 | 3/2015 | Madani | |
| 2015/0067020 A1 | 3/2015 | Makhervaks | |
| 2015/0067191 A1 | 3/2015 | Makhervaks | |
| 2015/0067789 A1 | 3/2015 | Madani | |
| 2015/0067809 A1 | 3/2015 | Madani | |
| 2015/0195303 A1 | 7/2015 | Holden | |
| 2015/0244817 A1 | 8/2015 | Johnsen | |
| 2015/0271244 A1 | 9/2015 | Bloch | |
| 2015/0358349 A1 | 12/2015 | Holden | |
| 2015/0363219 A1 | 12/2015 | Kasturi | |
| 2015/0381576 A1 | 12/2015 | Bosko | |
| 2015/0381590 A1 | 12/2015 | Bosko | |
| 2016/0036920 A1 | 2/2016 | Sama | |
| 2016/0036921 A1 | 2/2016 | Sama | |
| 2016/0285917 A1 | 9/2016 | Fry | |
| 2016/0380865 A1 | 12/2016 | Dubal | |
| 2017/0170988 A1 | 6/2017 | Mazarick | |

FOREIGN PATENT DOCUMENTS

| | | |
|---|---|---|
| CN | 102334112 | 1/2012 |
| CN | 102968344 A | 3/2013 |
| JP | 2011181080 A | 9/2011 |

OTHER PUBLICATIONS

European Patent Office, International Searching Authority, International Search Report and Written Opinion for International Appli-

(56) References Cited

OTHER PUBLICATIONS cation No. PCT/US2016/062795 dated Feb. 17, 2017, 17 Pages.
Evangelos Tasoulas et al., "Towards the InfiniBand SR-IOV vSwitch Architecture", 2015 IEEE International Conference on Cluster Computing © 2015 IEEE, pp. 371-380.
Evangelos Tasoulas et al., "A Novel Query Caching Scheme for Dynamic InfiniBand Subnets", 2015 15th IEEE/ACM International Symposium on Cluster, Cloud and Grid Computing © 2015 IEEE, pp. 199-210.
Vangelos Tasoulas, "Prototyping Live Migration With SR-IOV Supported InfiniBand HCSs", HPC Advisory Council Network of Expertise, Spain Conference 2013 Campus Diagonal Nord, Barcelona Spain, Sep. 23, 2013, 34 pages.
Olav Lysne et al., "Fast Dynamic Reconfiguration in Irregular Networks", © 2000 IEEE, pp. 449-458.
Eitan Zahavi et al., "Optimized InfiniBand™ fat-tree routing for shift all-to-all communication patterns", Concurrency Computation: Practice and Experience, Copyright © 2009 John Wiley & Sons, Ltd., 15 pages.
H. Subramoni et al., "Design of a Scalable InfiniBand Topology Service to Enable Network-Topology-Aware Placement of Processes", © 2012 Salt Lake City Utah, USA, 12 pages.
European Patent Office, International Searching Authority, International Search Report and Written Opinion for International Application No. PCT/US2016/062882 dated Feb. 22, 2017, 17 Pages.
State Intellectual Property Office of the People's Republic of China, Office Action dated Jan. 4, 2017 for Chinese Patent Application No. 201380008048.0 , 10 Pages.
State Intellectual Property Office of the People's Republic of China, Office Action dated Oct. 27, 2016 for Chinese Patent Applciation No. 201380008050.8, 10 Pages.
State Intellectual Property Office of the People's Republic of China, Office Action dated Oct. 24, 2016 for Chinese Patent Applciation No. 201380008060.1, 10 Pages.
State Intellectual Property Office of the People's Republic of China, Office Action for Chinese Patent Application No. 201380009011.X dated Dec. 30, 2016, 10 Pages.
United States Patent and Trademark Office, Office Action dated Nov. 9, 2017 for U.S. Appl. No. 15/210,599, 14 pages.

\* cited by examiner

SYSTEM AND METHOD FOR SUPPORTING LIVE MIGRATION OF VIRTUAL MACHINES IN A VIRTUALIZATION ENVIRONMENT

CLAIM OF PRIORITY

This application is a continuation of U.S. patent application Ser. No. 13/838,121, filed Mar. 15, 2013, now U.S. Pat. No. 9,450,885 issued Sep. 20, 2016 entitled SYSTEM AND METHOD FOR SUPPORTING LIVE MIGRATION OF VIRTUAL MACHINES IN A VIRTUALIZATION ENVIRONMENT" and which application claims the benefit of priority to U.S. Provisional Patent Application No. 61/615,731, entitled "SYSTEM AND METHOD FOR SUPPORTING LIVE MIGRATION OF VIRTUAL MACHINES THAT USE RDMA BASED COMMUNICATION" filed Mar. 26, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. Patent Application titled "SYSTEM AND METHOD FOR SUPPORTING LIVE MIGRATION OF VIRTUAL MACHINES IN AN INFINIBAND NETWORK", application Ser. No. 13/837,922, filed Mar. 15, 2013, now U.S. Pat. No. 9,397,954 issued Jul. 19, 2016;

U.S. Patent Application titled "SYSTEM AND METHOD FOR SUPPORTING LIVE MIGRATION OF VIRTUAL MACHINES BASED ON AN EXTENDED HOST CHANNEL ADAPTOR (HCA) MODEL", application Ser. No. 13/838,275, filed Mar. 15, 2013, now U.S. Pat. No. 9,432,304 issued Aug. 30, 2016; and U.S. Patent Application titled "SYSTEM AND METHOD FOR PROVIDING A SCALABLE SIGNALING MECHANISM FOR VIRTUAL MACHINE MIGRATION IN A MIDDLEWARE MACHINE ENVIRONMENT", application Ser. No. 13/838,502, filed Mar. 15, 2013, now U.S. Pat. No. 9,311,122 issued Apr. 12, 2016.

FIELD OF INVENTION

The present invention is generally related to computer systems, and is particularly related to supporting computer system virtualization.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein are systems and methods for supporting virtual machine live migration in a network. A virtual switch can be associated with a plurality of virtual functions (VFs), and wherein each said virtual function (VF) is associated with a separate virtual interface (VI) space. At least one virtual machine that is attached with a said virtual function (VF) can be associated with a virtual interface (VI), e.g. a queue pair (QP) in an Infiniband (IB) architecture. Furthermore, said at least one virtual machine operates to perform a live migration from a first host to a second host with said virtual function (VF) attached.

DETAILED DESCRIPTION

Figure 1:
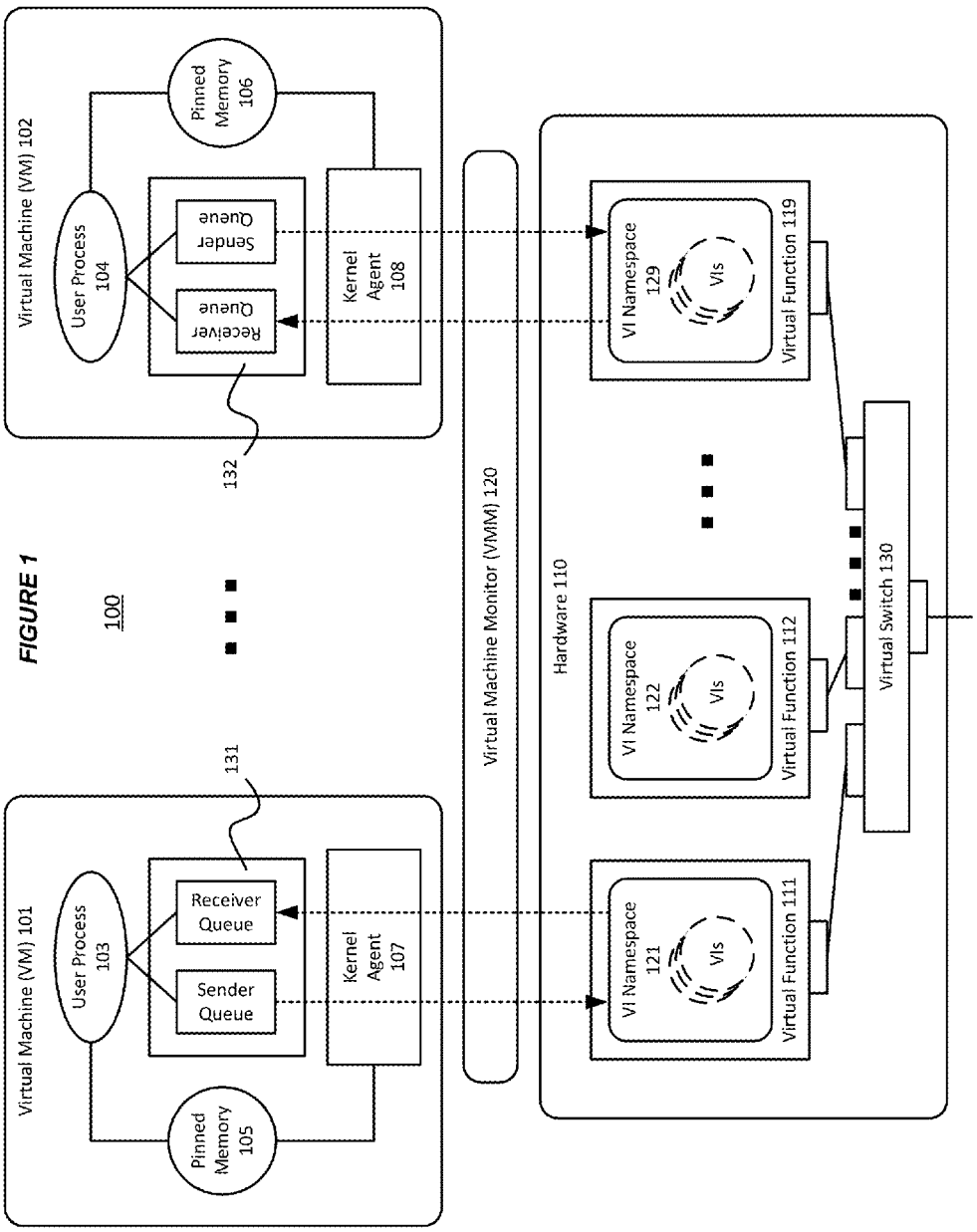
FIG. 1 shows an illustration of a virtual interface architecture (VIA) network device, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation. Also, the description of the invention as following uses the Xen virtualization model as an example for a virtualization model. It will be apparent to those skilled in the art that other types of virtualization models can be used without limitation.

Described herein are systems and methods that can support virtual machine (VM) live migration in a network.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand (IB) Architecture

The IB Architecture is a serial point-to-point full-duplex technology. The IB networks can be referred to as subnets, wherein a subnet consists of a set of hosts interconnected using switches and point to point links. An IB subnet can include at least one subnet manager (SM), which is responsible for initializing and bringing up the network, including the configuration of all the switches, routers and host channel adaptors (HCAs) in the subnet.

IB supports a rich set of transport services in order to provide both remote direct memory access (RDMA) and traditional send/receive semantics. Independent of the transport service used, the IB HCAs communicate using queue pairs (QPs). A QP is created during the communication setup, and can have a set of initial attributes such as QP number, HCA port, destination LID, queue sizes, and transport service that are supplied. An HCA can handle many QPs, each QP consists of a pair of queues, such as a send queue (SQ) and a receive queue (RQ), and there is one such pair present at each end-node participating in the communication. The send queue holds work requests to be transferred to the remote node, while the receive queue holds information on what to do with the data received from the remote node. In addition to the QPs, each HCA has one or more completion queues (CQs) that are associated with a set of send and receive queues. The CQ holds completion notifications for the work requests posted to the send and receive queue. Even though the complexities of the communication are hidden from the user, the QP state information is kept in the HCA.

Each physical IB device is assigned two addresses: the LID and globally unique identifier (GUID). The LID is used to route IB packets within a subnet, whereas the GUID is the hardware address that uniquely represents a physical IB device. The 64-bit GUID is combined with the local (64-bit) subnet prefix to form the global identifier. The 128-bit global identifier is used to route IB packets between IB subnets.

Input/Output (I/O) Virtualization

I/O Virtualization (IOV) can provide availability of I/O by allowing VMs to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

There can be different types of IOV technologies, such as emulation, paravirtualization, direct assignment (DA), and single root-I/O virtualization (SR-IOV). Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to different VFs. The IOMMU also apply memory and interrupt translations between the PF and the VFs.

There can be different types of SR-IOV models, e.g. a shared port model and a virtual switch model. In the shared port model, all the VFs can share a single port address and a single QP name space, and only a single HCA port is exposed to the network. In the virtual switch model, each VF is a virtual HCA that contains a unique port address and a unique QP name space, and one HCA for each VF on the device is exposed to the network. Thus, the virtual switch model can simplify IOV with more complex hardware.

The use of an SR-IOV capable device can yield near native performance and improved scalability. On the other hand, SR-IOV may not be fully incompatible with live migration and check-point/restart mechanisms.

Hardware Solution for Live Migration

In accordance with an embodiment of the invention, a hardware solution can support the live migration of virtual machines (VMs) between physical servers in an application transparent manner, based on a flexible, high performance and scalable virtualized 10 architecture. Furthermore, the hardware solution can increase the transparency of migration and improve interoperability between IB and SR-IOV. Additionally, the system can be applicable to other high-speed lossless networking technologies such as virtual interface architecture (VIA) and MYRINET® high speed local area networking system.

Using the hardware solution, an IB host channel adaptor (HCA) can differentiate each physical function (VF) as a virtual endpoint that has its own resource pool for the QP. Furthermore, the QP attributes, such as the QPN, can be reused after migration. Also, the IB HCA can support VM live migration based on a QP state for suspending and resuming communication.

Additionally, the system can avoid the handshaking mechanism that may be used to quiesce between the migrated QP and the peer of the migrated QP. Thus, the system allows the live migration of virtual machines (VMs) to reduce the service downtime to a level comparable to the retry timeout of a reliable connection in IB.

Furthermore, the system can represent a generic solution that supports VM live migration, including scenarios and applications with stringent timing requirements. For example, in high availability clusters, the VMs hosted by a faulty physical server can be migrated to another server within a limited time. The migration can happen after the fault is discovered, but before the faulty server turns into an unrecoverable error. Software approaches are insufficient to fulfill this requirement of low service downtime because they suffer from overhead. Moreover, software approaches are expensive in terms of development costs.

Virtual Endpoints

In accordance with an embodiment of the invention, a virtual interface architecture (VIA) hardware can integrate a PCI virtual switch to differentiate VIs created from each VF. Behind the virtual switch, multiple independent virtual endpoints can be discoverable by a network manager.

FIG. 1 shows an illustration of a virtual interface architecture (VIA) network device, in accordance with an embodiment of the invention. As shown in FIG. 1, a virtual interface architecture (VIA) network device 100 can include a hardware layer 110, a virtual machine monitor 120 and one or more virtual machines, e.g. VMs 101-102. Here, VM 101 can support user process 103 that are associated with pinned memory 105 based on kernel agent 107. VM 102 can support user process 104 that are associated with pinned memory 106 based on kernel agent 108.

A virtual switch 130 can be provided on the hardware layer 110. The virtual switch 130 can be associated with one or more virtual functions (VFs), e.g VFs 111-119. Each of the VFs 111-119 can create and manage one or more virtual interfaces (VIs).

In accordance with an embodiment of the invention, using the virtual switch model, each of the VFs 111-119 can be isolated as a dedicated PCI endpoint that can be assigned to a guest VM, e.g. VM 101 or VM 102. Furthermore, each of the VFs 111-119 can have its dedicated VI namespace 121-129 and can be considered as a complete VI endpoint. The VI namespace isolation can provide protection and flexibility in the virtualized environment. Each VF can be restricted to access the VI resources within a partition that extends the protection and isolation properties of VMs for the IO operations. Moreover, the VI attributes can be reused after the migration.

For example, the hardware layer 110 can be based on a high speed network architecture such as the IB architecture. Each of the VFs 111-119 can be a virtual host channel adaptor (vHCA) that contains a unique port address and a unique QP name space. Additionally, one vHCA can be exposed to the network for each VF on the IB device. Furthermore, each vHCA can be associated with its own QP namespace and can create and manage one or more queue pairs (QPs), such as QP 131 and 132 in the IB architecture. As shown in FIG. 1, each of the queue pairs (QPs) 131-132 can include a sender queue and receiver queue.

Furthermore, the VIA device 100 can take advantage of the IO memory management unit (IOMMU) functionality. The VI attributes can be stored in the memory regions accessed via the IO virtual memory that is translated by IOMMU. When a new VF is reattached to a VM, the hypervisor can change the IOMMU to remap the IO virtual memory to a new set of physical memory without explicitly recreating new VIs. Compared with the shared VI namespace model, the virtual switch model eases the resource migration and avoids the use of mapping tables to remap the VI attributes in order to maintain transparency for the running application.

Queue Pair (QP) Suspend State

Figure 2:
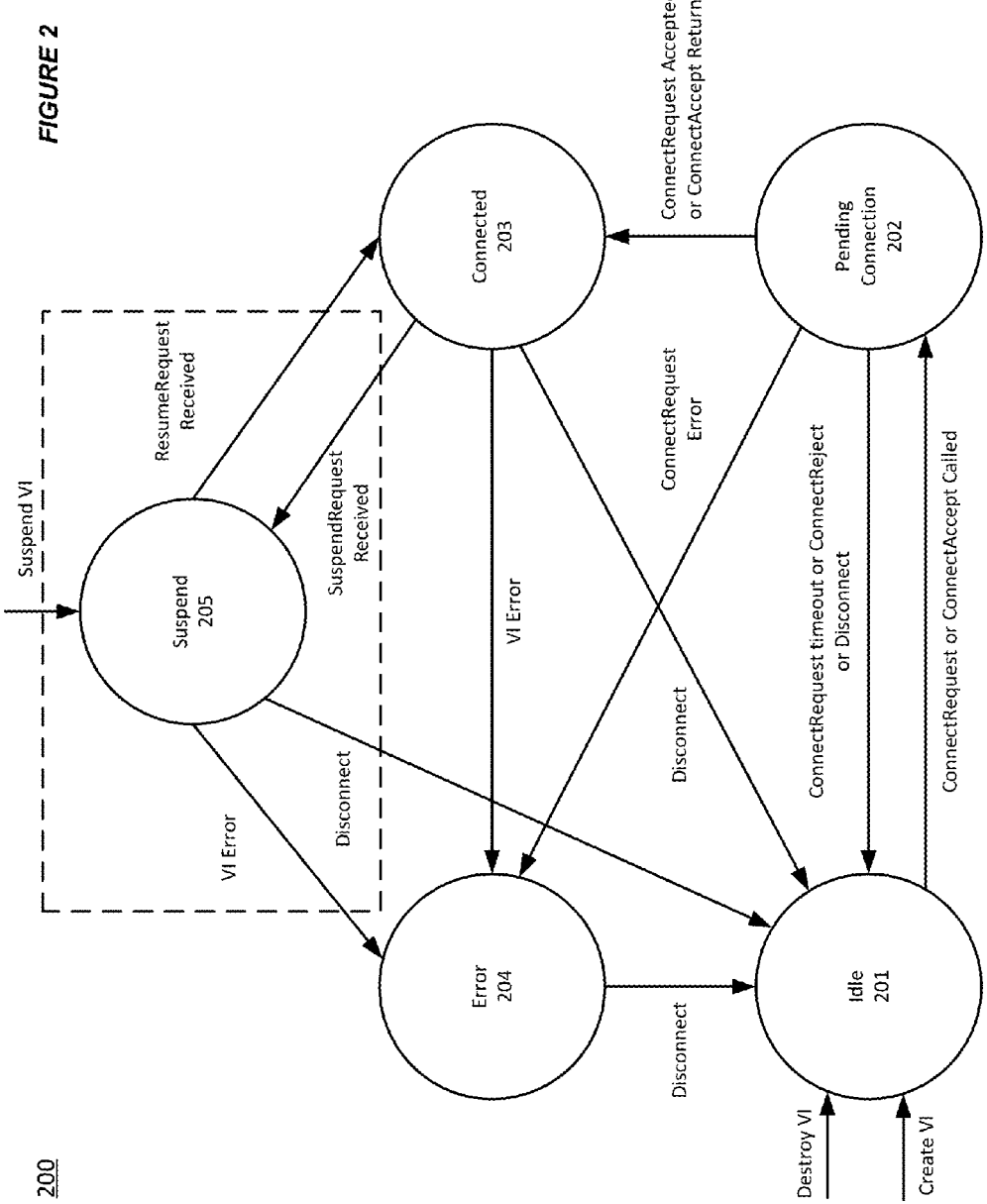
FIG. 2 shows an illustration of different states associated with a virtual interface (VI), in accordance with an embodiment of the invention.

FIG. 2 shows an illustration of different states associated with a virtual interface (VI), in accordance with an embodiment of the invention. As shown in FIG. 2, the lifecycle of a VI can include multiple states, such as: an idle state 201, a pending connection state 202, a connected state 203, an error state 204, and a suspend state 205.

The suspend state 205 indicates that the on-going communication is temporarily halted in order to have the VI in a quiescent state, e.g. during the live migration. The transition between the connected state 203 and the suspend state 205 can be driven by a software initiated request or through the VI event request. For example, during migration, the software interface can modify the migrating VI from the connected state 203 to the suspend state 205.

When a VI enters the suspend state 205, the VI can complete any previously initiated message transmission and flush any remaining message on the hardware sender queue without processing them. The hardware can ensure that the remaining messages are cached by a sender queue for the user process before flushing them. In the suspend state 205, any new message can be enqueued in both the sender queue and the receiver queue, and remains posted without being processed.

Furthermore, If an incoming message is targeting a suspended VI, a SuspendRequest event can be generated by the suspended VI to transit the peer VI into the suspend state 205. In such a case, the previous initiated message can be resent after received the ResumeRequest event and no timeout error may be generated on the incomplete transmission.

After a new VF is attached to the migrated VM and before the migrated VM is restarted at the new location, the stop-and-copy stage can reregister the IO virtual memory to a new set physical memory in IOMMU. Then, the software interface can modify the VI state of the migrated VM to the connected state 203. Then, the system can trigger a ResumeRequest event that is forwarded to the peer VI. The peer VI can then transit back to the connected state 203 without generating a ResumeRequest event. Thus, the suspend state 205 can provide a smooth transition during live migration of a VM, and the VIs can be in a quiescent state.

In accordance with an embodiment of the invention, in order to reduce the downtime during VM live migration, an approach, with a minimal delay, is to suspend a VI or to detach a VF right before all outstanding operations have completed. Thus, an extension can improve the timeout and retry handling provided by the reliable transport protocol as part of the suspend state 205 handling. The extended retry and timeout logic can transit a VI into the suspend state 205 without causing a fatal error for either the peer VI or the migrated VI.

Thus, a VI can be migrated without having a hard real-time constraint on the availability of the VI after migration. This approach can also cover the scenario where no event reporting (SuspendRequest and ResumeRequest) is generated between VIs due to a delay in the network. Additionally, in a scenario with multiple VIs, each VI can perform the above operation concurrently.

Figure 3:
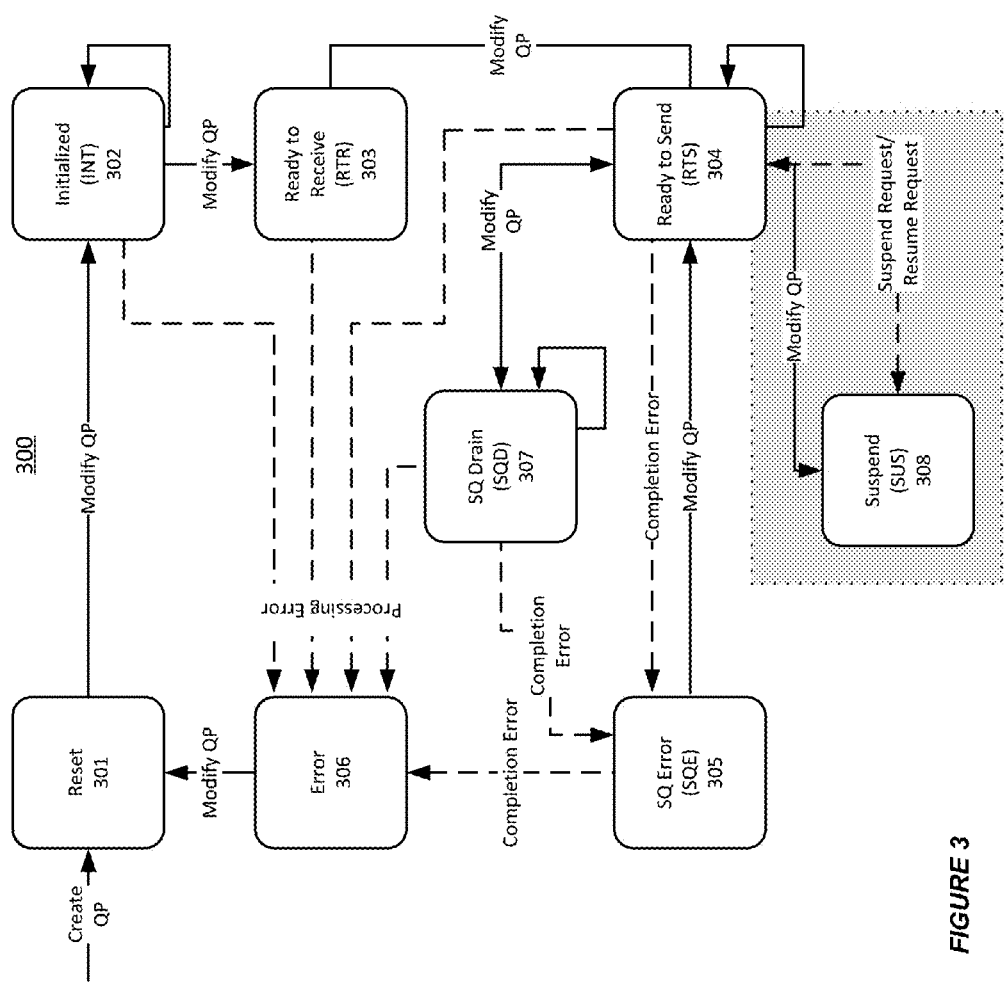
FIG. 3 shows an illustration of different states associated with a queue pair (QP), in accordance with an embodiment of the invention.

FIG. 3 shows an illustration of different states associated with a queue pair (QP), in accordance with an embodiment of the invention. As shown in FIG. 3, the lifecycle 300 of a QP includes multiple states, such as: a reset state 301, an initialized (INT) state 302, a ready to receive (RTR) state 303, a ready to send (RTS) state 304, a SQ Error (SQE) state 305, an error state 306, a SQ drain (SQD) state 307, and a suspend (SUS) state 308.

The suspend state, SUS 308, can temporarily halt the ongoing communication to quiesce a QP during migration. Transitions between the RTS 304 and the SUS 308 can be triggered by a software-initiated request or through an event request. During migration, the software interface can transit the migrating QP from the RTS 304 state to the SUS 308 state. When a QP enters the suspend state, it can complete any previously initiated message transmission and flush any remaining messages in the SQ without processing them. The hardware can also ensure that the remaining messages are cached by the user process buffer before flushing them. In the suspend state, any new message can be enqueued in both the SQ and the RQ, but remain posted without being processed.

The Networking and Routing Perspective of VM Live Migration

Figure 4:
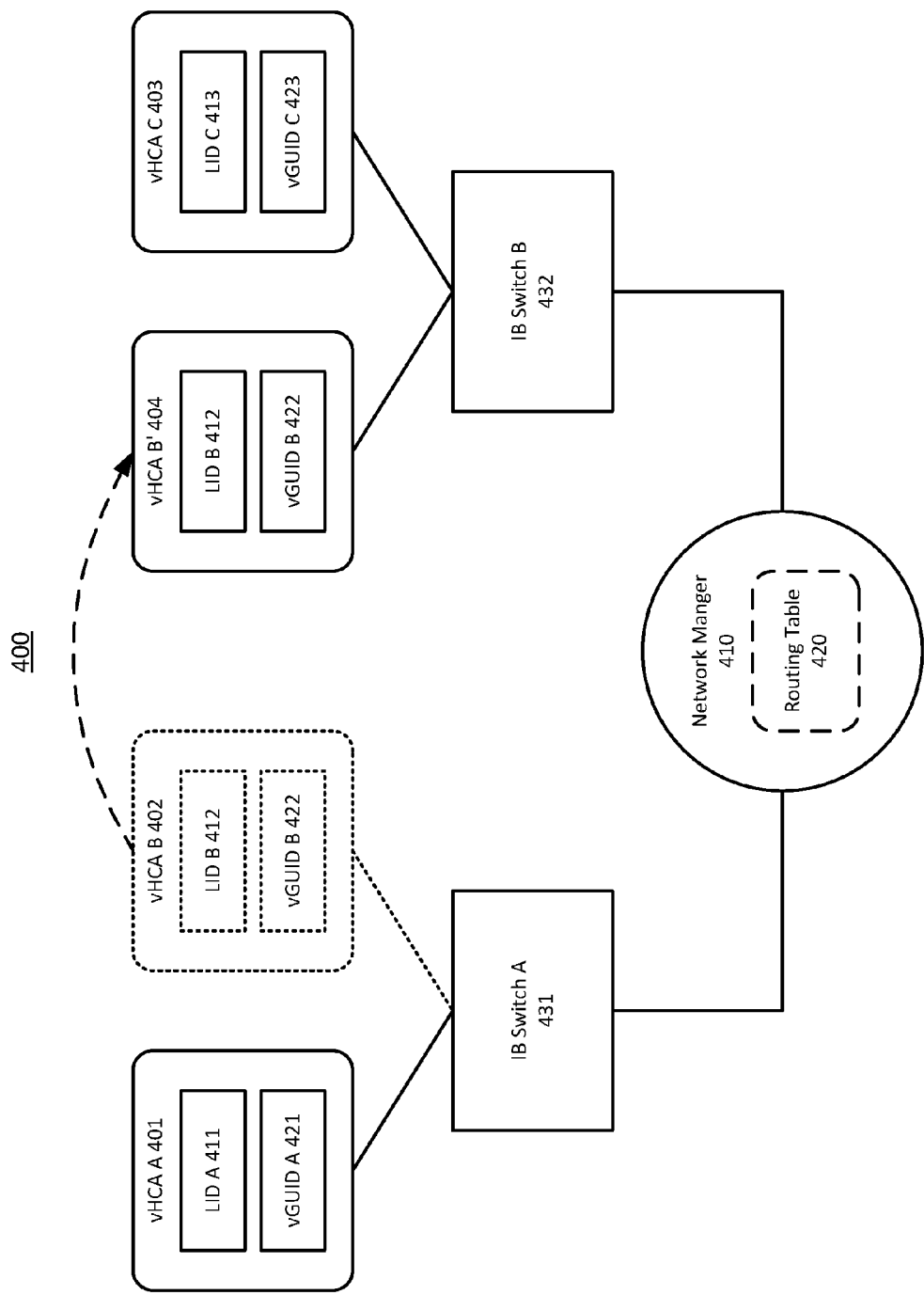
FIG. 4 shows an illustration of the live migration of a virtual machine (VM) from the network and routing perspective, in accordance with an embodiment of the invention.

FIG. 4 shows an illustration of the live migration of a virtual machine (VM) from the network and routing perspective, in accordance with an embodiment of the invention. As shown in FIG. 4, a virtualization environment 400 can include a plurality of vHCAs, e.g. vHCAs A-C 401-403. Each of the vHCAs A-C 401-403 can function as a complete IB endpoint, which can provide transparency for virtualization.

Additionally, the virtualization environment 400 can include a network manager 410. The network manager can discover the vHCAs A-C 401-403 behind the IB switches A-B 431-432, and can recognize each of the vHCAs A-C 401-403 based on a different LID and vGUID. For example, vHCA A 401 can be assigned with a LID A 411 and a vGUID A 421, while vHCA A 402 can be assigned with a LID B 412 and a vGUID B 422 and vHCA C 403 can be assigned with a LID C 413 and a vGUID C 423.

In accordance with an embodiment of the invention, during a VM migration, the network manager 410 can observe that an IB endpoint, e.g. vHCA B 402, goes down (i.e. suspended) behind the IB switch A 431, and reappears at the other side of the network (as vHCA B 404) behind the IB switch B 432, with the same addresses, e.g. the LID B 412 and the vGUID B 422, being carried over to the new location.

After the migration, the network manager 410 can update the routing table 420 to reflect the new rearrangement of the LID after its shift. Furthermore, a new routing algorithm that modifies the LID locally can be implemented in order to reduce the rerouting time of the entire network. Additionally, the network manager 410 can also ensure that the new LID arrangement is deadlock free.

Furthermore, a high-speed network can have limited local address resources. For example, an IB network, which may use a 16-bit LID, can quickly run out of address space, when each vHCA is assigned its own LID and each node in a 1000-node cluster hosts multiple VMs.

In accordance with an embodiment of the invention, the system can use different approaches to handle the scalability issue in a virtualization environment. For example, the system can extend the LID addressing space to 32-bit, or combine the vGUID with the LID to perform routing between vHCAs. The first solution does not require any architecture modification in the network manager; however, it is not backward compatible with older hardware.

The Virtual Machine Perspective

Figure 5:
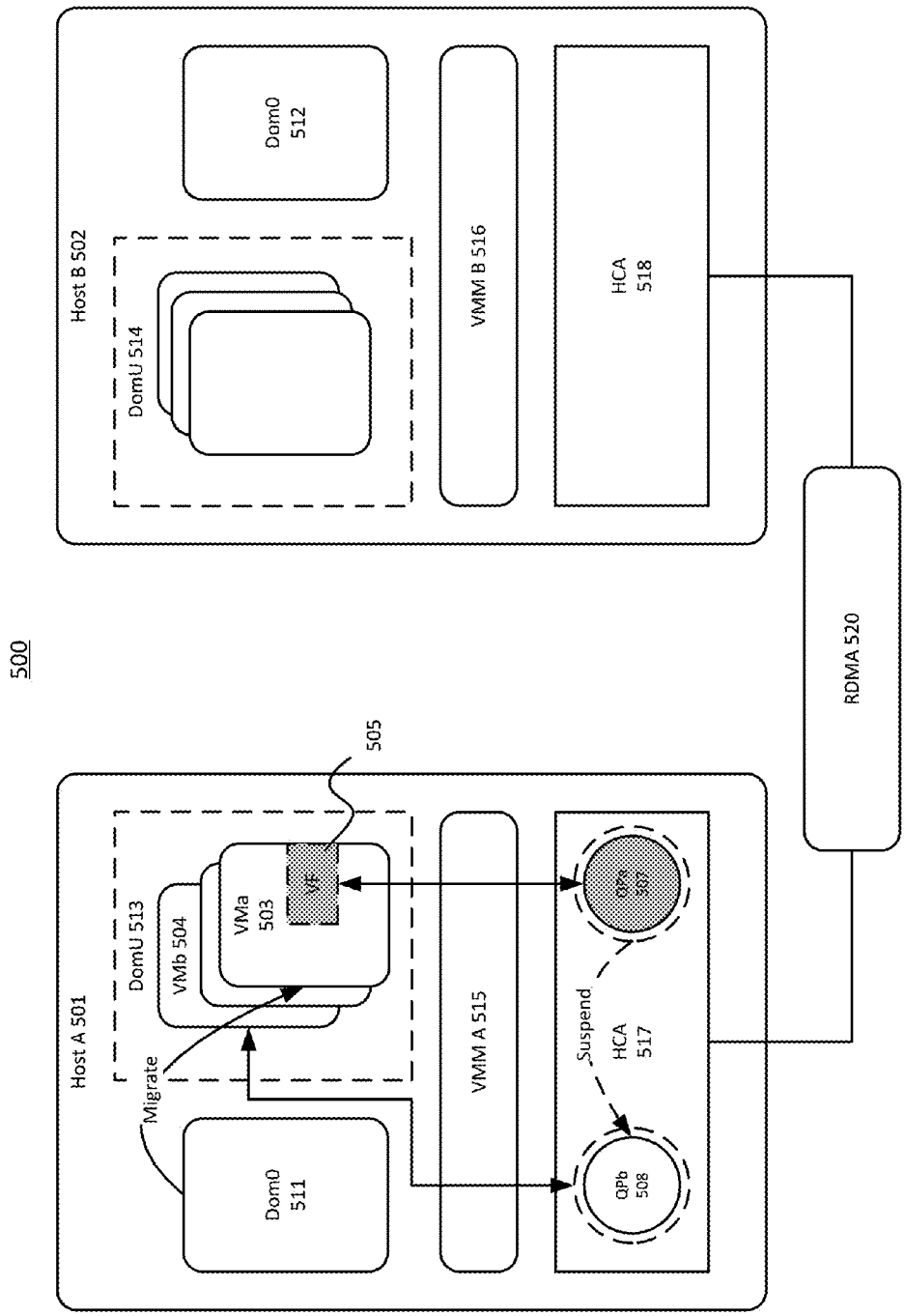
FIG. 5 shows an illustration of a virtualization environment before a virtual machine (VM) live migration, in accordance with an embodiment of the invention.

FIG. 5 shows an illustration of a virtualization environment before a virtual machine (VM) live migration, in accordance with an embodiment of the invention. As shown in FIG. 5, an IB network 500 can include a plurality of hosts, e.g. hosts A-B 501-502. Host A 501 includes VMM A 515 that uses a HCA 517, and can support a privileged domain (or a management domain), Dom0 511, that manages a guest domain, e.g. DomU 513. Also, host B 502 includes VMM B 516 that uses a HCA 518, and can support a Dom0 512 that manages DomU 514.

Furthermore, VMa 503 on host A 501 can be attached with a VF, e.g. VF 505, which is connected to a queue pair, e.g. QPa 507. Additionally, VMa 503 can be in communication with VMb 504, which is associated with QPb 508.

In accordance with an embodiment of the invention, the privileged domain, e.g. Dom0 511 on host A 501, does not require a device, e.g. VF 505, to be detached during the migration. The system may only require that the active QPs, e.g. QPa 507, be suspended at the stop-and-copy stage.

Figure 6:
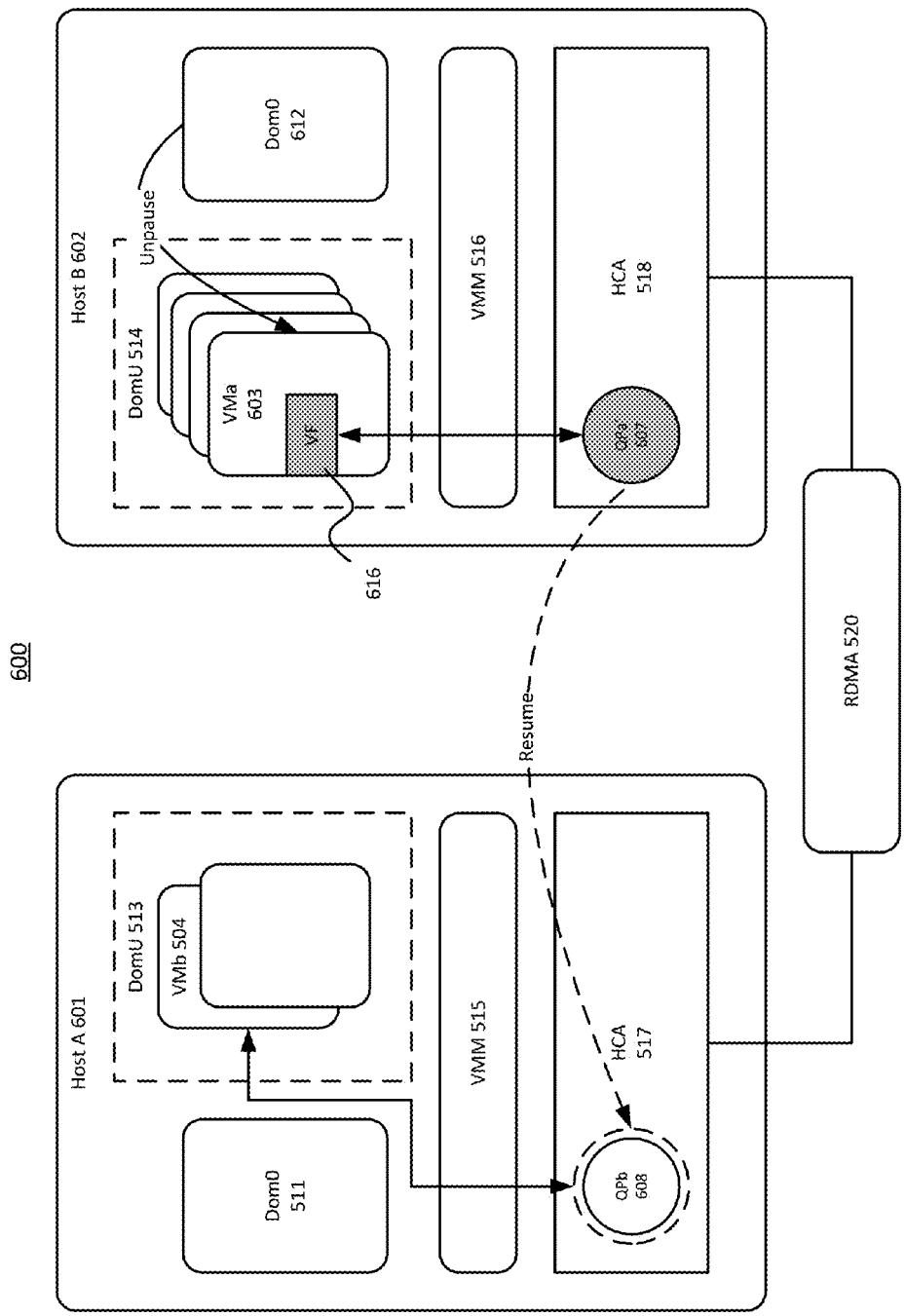
FIG. 6 shows an illustration of a virtualization environment after a virtual machine (VM) live migration, in accordance with an embodiment of the invention.

As shown in FIG. 5, the privileged domain, Dom0 511, on host A 501 can initiate the migration of VMa 503 to host B 502 (as VMa 603 in FIG. 6). Before the migration of VMa 503, the system can perform a state transition operation that puts it into the suspend state. Furthermore, the suspended QPa 507 can instruct QPb 508 to go into the suspend state as well, after receiving an incoming packet from QPb 508.

Then, the VM migration can be performed by synchronizing the dirty pages (memory), including the I/O virtual memory, between the source and destination servers, e.g. based on the remote direct memory access (RDMA) connections 520.

FIG. 6 shows an illustration of a virtualization environment after a virtual machine (VM) live migration, in accordance with an embodiment of the invention. As shown in FIG. 6, an IB network 600 can include a plurality of hosts, e.g. hosts A-B 601-602. (Additionally, elements in FIG. 6 that have the same number as in FIG. 5 can serve the same function).

After the migration to host B 602, VMa 603 can be attached with a new VF, e.g. VF 616, which is connected to a queue pair, e.g. QPa' 607. Here, QPa' 607 is logically the same QP as QPa 507 in FIG. 5 and has the same context information in the virtual memory of VMa 503 (or VMa 603).

Furthermore, before the VMa 603 is unpaused, the privileged domain, Dom0 612, can perform a state transition on QPa' 607, which can put QPa' 607 back to the RTS state. Furthermore, QPa' 607 can resume the communication with QPb 608 on host A 601.

Thus, the service downtime for the migration can be equivalent to the duration of the stop-and-copy stage. Also, using RDMA operations to perform migration can further reduce service downtime and total migration time.

Figure 7:
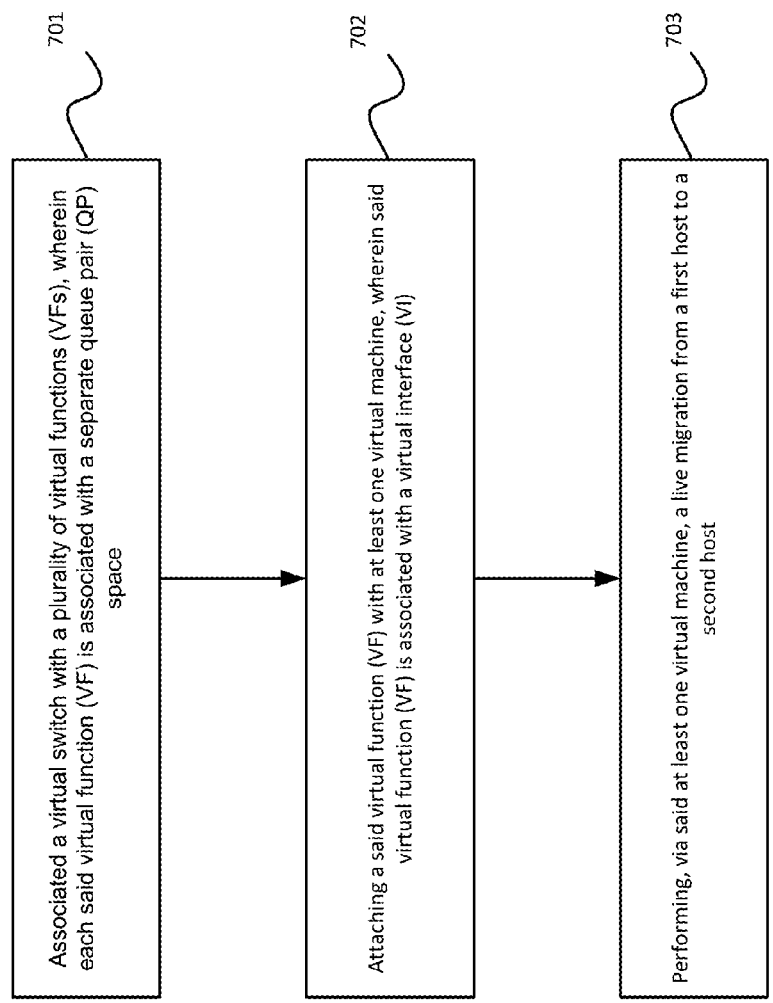
FIG. 7 illustrates an exemplary flow chart for supporting the live migration of a virtual machine in a virtualization environment, in accordance with an embodiment of the invention.

FIG. 7 illustrates an exemplary flow chart for supporting the live migration of a virtual machine in a virtualization environment, in accordance with an embodiment of the invention. As shown in FIG. 7, at step 701, the system can associate a virtual switch with a plurality of virtual functions (VFs), wherein each said virtual function (VF) is associated with a separate queue pair (QP) space. Furthermore, at step 702, the system can attach a said virtual function (VF) with at least one virtual machine, wherein said virtual function (VF) is associated with a virtual interface (VI). Then, at step 703, said at least one virtual machine can perform a live migration from a first host to a second host with said virtual function (VF) attached.

Extended HCA Model

Figure 8:
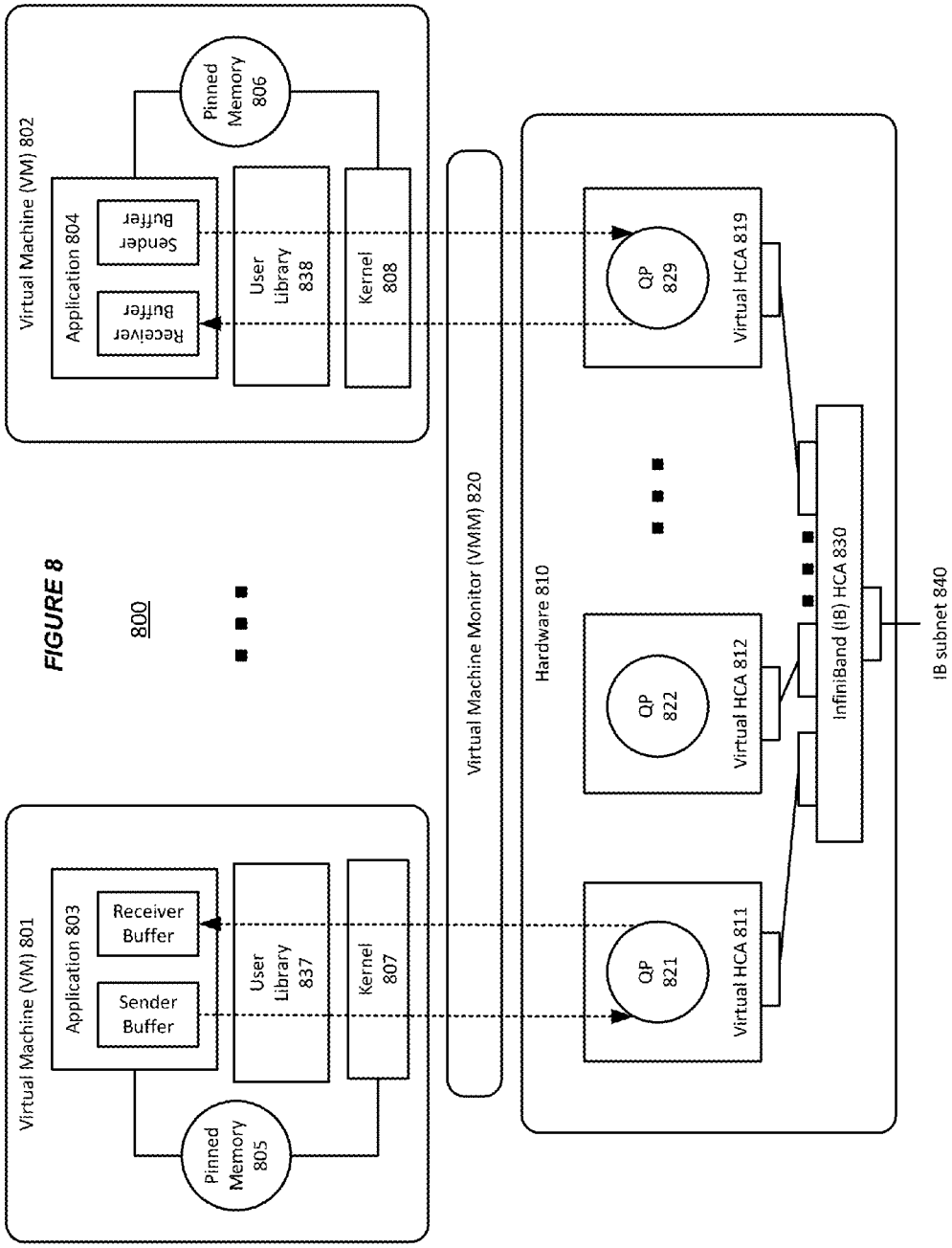
FIG. 8 shows an illustration of Infiniband architecture (IBA) network device, in accordance with an embodiment of the invention.

FIG. 8 shows an illustration of Infiniband architecture (IBA) network device, in accordance with an embodiment of the invention. As shown in FIG. 8, an Infiniband architecture (IBA) network device 800 can include a hardware layer 810, a virtual machine monitor 820 and one or more virtual machines, e.g. VMs 801-802. VM 801 can support application 803 that are associated with pinned memory 805 based on kernel 807 and user library 837. VM 802 can support application 804 that are associated with pinned memory 806 based on kernel agent 808 and user library 838.

The hardware layer 810 can include a fabric adaptor, such as an IB HCA 830, that connects to an IB subnet 840. Furthermore, the IB HCA 830 can be associated with a plurality of vHCA instances, e.g. vHCAs 811-819.

In accordance with an embodiment of the invention, the fabric adaptor, e.g. the physical HCA 830, can implement a virtual switch model, an extended HCA model, or a combination of both models. Furthermore, using the extended HCA model, there may be only a physical HCA 830 without a switch. The virtual HCAs 811-819 represent an extension of the physical HCA model, and one or more of the virtual HCAs instances 811-819 can be accessible from the fabric, e.g. IB subnet 840, via the physical HCA 830 ports.

In accordance with an embodiment of the invention, the hardware layer 810 can support the following features in order to preserve of the allocated IB resources for performing VM live migration.

1. QP context (e.g. QP numbers) can be preserved by allowing each vHCA to have a private QP space.
2. Memory region numbers can be preserved by allowing each vHCA to have a private memory region number space.
3. Registered memory can be preserved by allowing each vHCA to implement a private virtual address space for accessing the local physical host local memory.

A private QP space can be implemented using either a virtual switch based model, which is discussed in the above sections, or by using an extended HCA model. The extended HCA model, which extends the HCA specification, allows the definition of multiple vHCA instances 811-819, each of which can have a private QP space. As shown in FIG. 8, each of the vHCAs 811-819 can support a queue pair (QP), e.g. QP 821-829, which can be used by the sender/receiver buffers associated with an application, e.g. application 803 or 804, for sending and receiving packets.

Furthermore, the extended HCA specification can have the advantage of not depending on a more complex fabric topology. Additionally, a private memory region number space can be implemented for each vHCA based on the same alternatives as for private QP space.

In accordance with an embodiment of the invention, a private virtual address space for local physical memory can be implemented independently of whether the vHCA scheme is based on the virtual switch model or the extended HCA model.

One way to implement the private virtual address space is by using a server platform, where the local memory address space observed by the physical HCA represents a virtual memory. This virtual memory can be implemented by the host platform specifically for each SRIOV VF, i.e. each of the vHCAs 811-819.

Another way to implement the private virtual address space is by including the memory management unit (MMU) of the physical HCA within the set of system MMUs that are controlled by the platform hypervisor, e.g. VMM 820. Thus, the VM specific address spaces can be migrated between different physical hosts without changing any virtual address, with the virtual to physical address mappings being updated as needed. (e.g. the private virtual address space can be implemented by having a system MMU between the physical HCA and the local physical memory.

In accordance with an embodiment of the invention, the connection state can be preserved in the local memory of the VM that is being migrated. Also, the connection state can be re-established (or re-used) for the new vHCA after the migration, without a need for allocating any new resources.

Furthermore, a suspended state (as shown in FIG. 3) can be applied to both the migrated QP and the remote peer QPs connected to the migrated QP. Thus, the system can ensure that no timeout may take place during the VM migration, and the system can allow the migration operation to take an arbitrary amount of time independently of the IB connection related timeout values implemented by the peers of the migrated VM. Furthermore, in order to allow IB addresses associated with a connection to change as a result of the migration, the system can update the address information for a QP in suspended state.

Communication with Remote QP Peers

In accordance with an embodiment of the invention, the system can use special header information and/or non-solicited messages for supporting communication between peers. The system allows VM live migration to be initiated without performing quiesce operations between the remote peers. Furthermore, the system allows the remote peers to learn about the migration and to enter the suspended state in an asynchronous event driven manner.

For example, a vHCA route header (VRH) can be supported, and the VRH based vHCA addressing can be used instead of global route header (GRH) based addressing in an IB network. Packets containing a VRH can be delivered to the destination vHCA index (DVI) as specified in the VRH, e.g. if the destination vHCA tag (DVT) in the VRH is not zero and the DVT in the header is the same as the DVT in the vHCA tag table entry identified by the DVI in the VRH. The system can specify which packets are expected to contain a VRH via LID policy, when no wire protocol extension that defines VRH presence exists. Alternatively, the system can define QP number ranges that are common for all vHCAs, and where different ranges can be associated with the use of VRH or other protocol policies. Furthermore, VRH may not be specified via QP context since the QP context is not known until the vHCA index has been retrieved from the VRH.

Figure 9:
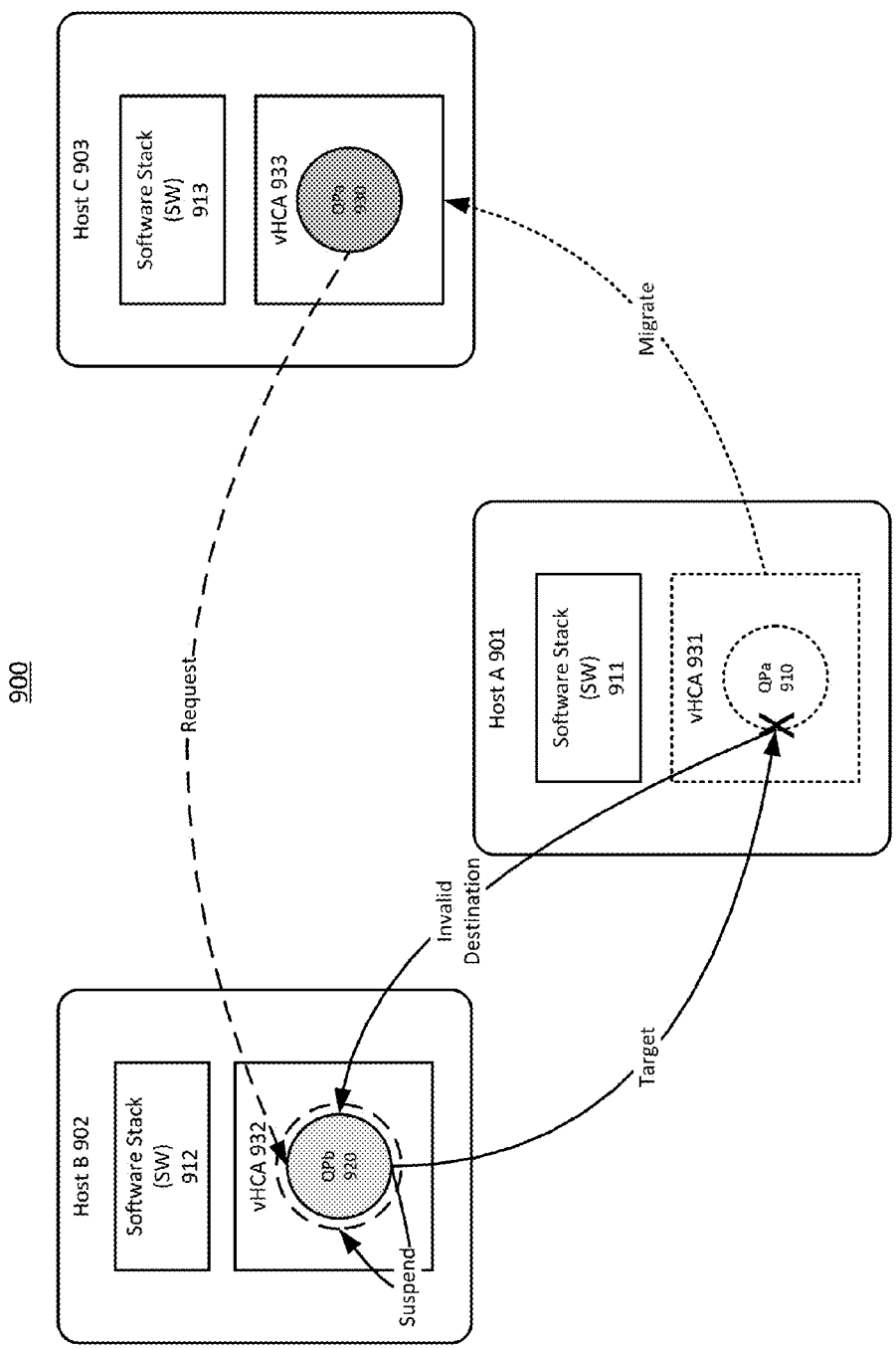
FIG. 9 shows an illustration of supporting communication between a migrated queue pair (QP) and a remote peer QP, in accordance with an embodiment of the invention.

FIG. 9 shows an illustration of supporting communication between a migrated queue pair (QP) and a remote peer QP, in accordance with an embodiment of the invention. As shown in FIG. 9, the virtualization environment 900 can include a plurality of hosts, e.g. hosts A-C 901-903, each of which can include a software stack, e.g. one of SWs 911-913. (The software stack can reside in a kernel space, a user space or both)

Furthermore, QPa 910 on host A 901 can be in communication with QPb 920 on host B 902, before QPa 910 migrates to host C 903 (as QPa 930). QPa 910 can be set in a suspend state to enable the migration, during which time QPb 920 may send a packet (UD, UC or RC) to QPa 910. This packet, which targets the invalid vHCA 931 on host A 901, may use either GRH or VRH/LID-map based addressing.

After receiving the packet targeting the invalid vHCA 931, host A 901 can generate a local asynchronous event and optionally send an unsolicited response packet to QPb 920 on vHCA 932. Furthermore, when QPb 920 receives the unsolicited response packet, it can generate a local asynchronous event containing the information from the unsolicited response. Then, QPb 920 can automatically perform the transition to the suspended state (as shown in FIG. 3), if QPb 920 is an enabled reliable connected (RC) or unreliable connection (UC) QP.

In accordance with an embodiment of the invention, the verbs interface provided by the IBA can include a ModifyQP and ModifyAddressHandle option for transferring a queue pair (QP) to and from the suspended state. Furthermore, when the suspended state is reset for an RC QP, the retry count and timers can be reset to initial values (i.e. any "retry budget" consumed before entering suspended state can be "forgotten"). While in the suspended state, the path information can be updated for an RC or UC QP. QPs and address handles can remain in the suspended state until local software, e.g. SWs A-C 911-913, explicitly resets the suspended state. Here, before resetting the suspended state, the local software can obtain updated path information that may include destination LID and VRH information.

In accordance with an embodiment of the invention, whenever a vHCA port identified by its vGUID becomes operational in an IB network, the vHCA port can be reported via the vGUID and vHCA information for the relevant physical HCA port. In the case of VM/vHCA migration, the vGUID and vHCA information of the destination nodes physical HCA port and SMA information can be updated when the migrated vHCA become operational. After the migration of a VM, remote peers with suspended QPs or address handles can observe the relevant information and reset the suspended state after having updated the relevant path information.

Furthermore, when a migrated VM and vHCA is restarted at the new location, communication peers may not be aware of the migrated vHCA. For example, when a migrated RC QP, e.g. QPa 930, sends requests to its peer, QPb 920, QPa 930 can have the correct path information since QPb 920 likely has not been migrated in the same timeframe. Also, if QPb 920 does not have the updated path information, acknowledges and responses to incoming requests from the migrated QPa 930 may be sent to a stale destination. Then, the stale destination can send an unsolicited response to QPb 920 causing QPb 920 to realize that the path information has already been updated.

Additionally, a migrated vHCA, e.g. vHCA 933, that starts up at a new location, e.g. host C 903, may depend on peers to update path information in a timely fashion, in order to avoid the outgoing requests becoming timeout. For example, when QPb 920 does not have the correct path information, the outgoing requests from the migrated vHCA 933 can timeout due to that fact that the acknowledge and responses fail to come back.

In order to ensure that the original request packet from the migrated QPa 930 can inform the peer QPb 920 that a migration has taken place, the system can make the migration information detectable from the header contents in the request packet. For example, instead of relying on the peer to detect any relevant change in source address information, the VRH can contain a migration count field. The migration count field can be updated before the migrated vHCA 933 become operational again at the new location, host C 903. Furthermore, a change in the migration count, relative to what is recorded in the peer QP state, can cause an asynchronous event which identifies the condition on the peer node. Thus, by explicitly notifying the remote peer via the VRH migration count field, the system can avoid timeouts for QPs on the migrated HCA side in most cases.

In accordance with an embodiment of the invention, in order to totally avoid the real-time dependency on peers to update path information, the migrated vHCA can start up with QPs in a un-suspend-pending state. The un-suspend-pending QP state is similar to the suspended state with the exception that outgoing requests are allowed. Furthermore, after a response or acknowledge for a request, which is generated after the vHCA is re-started after migration, is received from a remote peer, the un-suspend-pending state can be reset and the QP can behave as normal.

Furthermore, an implementation (HW, FW or SW) of the system can use timeouts and retries to address the loss of packets, while the timeout behaviour of the QP itself can be the same as in the suspended state (i.e. not going to error state because of the timeout). Additionally, the un-suspend-pending state can be used to gracefully perform the transition out of the suspended state for vHCAs/QPs that have not been migrated.

Alternatively, in the cases where VRH is not used, the signalling of migration can be accomplished via unsolicited messages. For example, the unsolicited messages can potentially be sent interleaved with normal messages following restart after migration. Furthermore, the receipt of requests or responses from the remote peer QP can eliminate the need for sending such unsolicited messages. Here, the use of unsolicited messages allows the signalling to take place independently of any other communication activity on a QP/connection.

Thus, using additional header information and/or unsolicited messages, the system allows a migrated QP to automatically signal its peer QP about both the migration taking place and provide its peer QP with the new address information involved. Any relevant update of address information can take place in parallel with a subnet manager's noticing and reporting of the relevant information and can further reduce latency for bringing the connections back to fully operational state.

Figure 10:
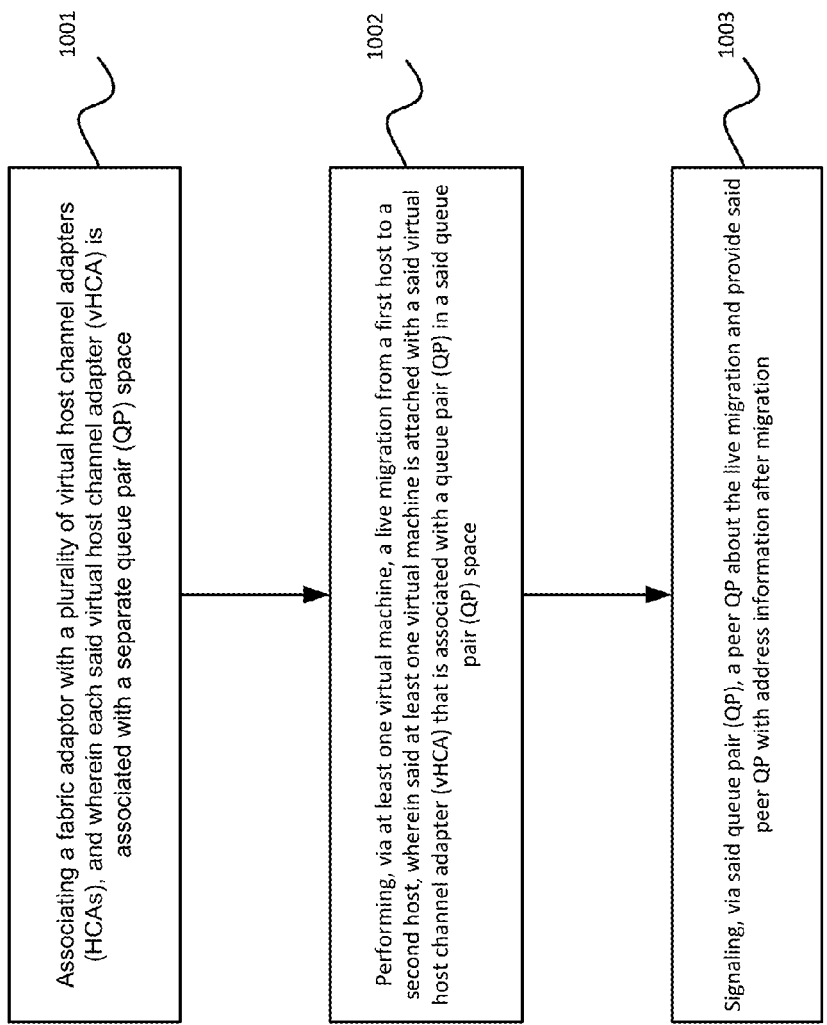
FIG. 10 illustrates an exemplary flow chart for supporting the live migration of a virtual machine based on an extended vHCA model, in accordance with an embodiment of the invention.

FIG. 10 illustrates an exemplary flow chart for supporting the live migration of a virtual machine based on an extended vHCA model, in accordance with an embodiment of the invention. As shown in FIG. 10, at step 1001, the system can associate a fabric adaptor with a plurality of virtual host channel adapters (HCAs), and wherein each said virtual host channel adapter (vHCA) is associated with a separate queue pair (QP) space. Here, the fabric adaptor can implement a virtual switch model, an extended host channel adaptor (HCA) model, or a combination of both models. Furthermore, at step 1002, at least one virtual machine can perform a live migration from a first host to a second host, wherein said at least one virtual machine is attached with a said virtual host channel adapter (vHCA) that is associated with a queue pair (QP) in a said queue pair (QP) space. Then, at step 1003, said queue pair (QP) can signal a peer QP about the live migration and provide said peer QP with address information after migration.

Scalable Addressing Scheme

In accordance with an embodiment of the invention, the Virtual GUID associated with a VM, which is part of the layer 3 (L3) address, can be preserved through live migrations and the Virtual GUID can be used to uniquely identify the VM from both the perspective of communicating peers, as well as from the perspective of the subnet manager.

Unlike the software approach where there is an inherent need to update the address information associated with the remote connection peer that is being migrated, the extended HCA model allows the address information associated with a VM to be preserved across migrations. Thus, there is no inherent need to update the address information for connection peers, since the system can preserve IB layer 2 (L2), or local route header (LRH), address information can be preserved in addition to the L3, or global route header (GRH), address.

In accordance with an embodiment of the invention, the system can achieve scalability and flexibility within an IB subnet. For example, an IB subnet may be limited to 48K LID values. The system supports an ignore LMC feature, which allows the HCA to be addressed based on whatever LID values that a subnet manager in the IB subnet decides to use to facilitate packet forwarding to the relevant HCA ports (physical port or vHCA port). For example, HCA ports can be not forced to have a dedicated LID or a dedicated power of two based contiguous LID range (as defined by the HCA port LID Mask, i.e. LMC value).

Additionally, the system can support the use of a range of admin LIDs, which represent LID values that the subnet manager is not going to use as statically allocated LIDs/LID ranges for physical ports. Furthermore, the subnet manager can assign the admin LIDs to VMs that need unique LIDs for addressing, either at VM creation time, or dynamically during the VM life time.

Figure 11:
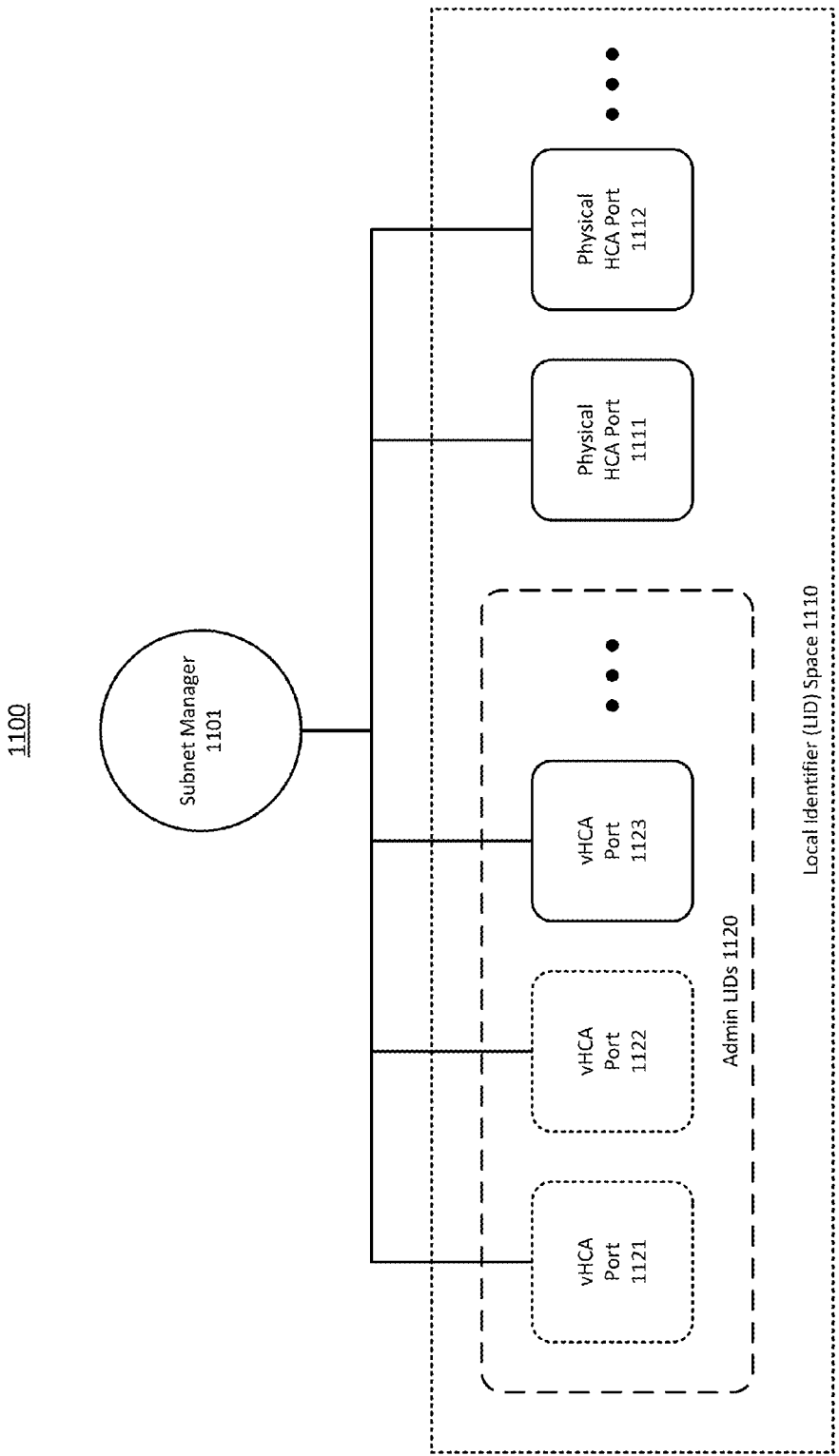
FIG. 11 shows an illustration of supporting local identifier (LID) assignment in a virtualization environment, in accordance with an embodiment of the invention.

FIG. 11 shows an illustration of supporting local identifier (LID) assignment in a virtualization environment, in accordance with an embodiment of the invention. As shown in FIG. 11, the virtualization environment 1100 can include a subnet manager (SM) 1101, which can be responsible for assigning LIDs for various network devices, such as physical HCA ports 1111-1112, and virtual HCA ports 1121-1123.

The SM 1101 can support a policy interface where a range of admin LIDs 1120 can be reserved. Each admin LID is special in the sense that the SM 1101 may not assign this value to any port unless instructed via policy input.

Furthermore, the SM 1101 can support a policy interface where a vGUID can be associated with one or more such admin LIDs and where vGUID migration implies that routing for the corresponding LIDs are set up to the relevant physical HCA port. Additionally, the SM 1101 may not allow to associate a vGUID with a physical HCA port that does not support the ignore LMC feature, if the vGUID is associated with an admin LID.

In accordance with an embodiment of the invention, the routing of an admin LID can be based on the routing algorithm and policies that are active for the SM 101 at the moment. Path information for a vGUID that is associated with the admin LID(s) can reflect the assigned admin LID(s) according to policies defined by the SM 101.

Thus, the system can use the ignore LMC and admin LID features to provide scalability and flexibility for addressing within an IB subnet, independent of VM live migration operations. In general, these features can be used to facilitate dynamic creation of one ore more additional LIDs that can be used to reach any physical or virtual HCA port within an IB subnet.

Furthermore, dynamic quality of service (QoS), high availability (HA), and/or other multiple address based properties can be established dynamically at run-time. These features can be applied for any specific physical or virtual HCA port without a need for subnet re-initialization, or causing any other negative impact on the on-going communication within the IB subnet.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting virtual machine live migration in a host channel adapter (HCA) comprising an HCA microprocessor and an HCA memory and connected to a network, said HCA installed in a host computer comprising a host microprocessor and a host memory and a virtual machine (VM) operating on said host computer, the method comprising:
configuring the HCA to implement a virtual switch using said HCA microprocessor and HCA memory;
configuring the HCA to implement a plurality of virtual host channel adapters (vHCAs) associated with the virtual switch wherein each of the plurality of vHCAs is assigned a local identifier (LID) and provides a virtual interface (VI) having a separate VI namespace;
attaching a vHCA of said plurality of vHCAs to said VM operating on said host computer, wherein said vHCA provides a queue pair (QP) for communicating messages between said VM and a communication endpoint over said network, and wherein said QP is provided by the VI provided by said vHCA and uses the LID assigned to said vHCA as a communication attribute; and
wherein said HCA and vHCA are configured such that upon migrating said VM from said host computer to another host computer, said vHCA remains attached to said VM and continues to use said assigned LID after migration, such that said queue pair (QP) which uses said LID as a communication attribute continues to provide for communication of messages between said VM and said communication endpoint over said network after migration of said VM to said another host computer.

2. The method according to claim 1, further comprising:
associating a plurality of QP attributes including said LID with said QP, wherein said QP attributes are reused after migration.

3. The method according to claim 2, further comprising:
storing said plurality of QP attributes including said LID in memory regions accessible via an IO virtual memory that is translated by an input/output memory management unit (IOMMU).

4. The method according to claim 1, further comprising:
suspending said vHCA into a suspend state that temporarily halts ongoing communication between said virtual machine and said communication endpoint to quiesce the QP during migration from said host to said another host.

5. The method of claim 1, wherein each of the plurality of vHCAs is associated with a virtual globally unique identifier (vGUID).

6. The method according to claim 5, further comprising:
configuring the HCA to enable discovery of the plurality of vHCAs by a subnet manager operating on a switch in said network based on a LID and a vGUID associated with each of the plurality of vHCAs.

7. The method according to claim 5, further comprising: allowing the subnet manager to combine vGUID with LID to perform routing between vHCAs.

8. The method according to claim 5, further comprising: updating a routing table in at least one switch to reflect a rearrangement of the LID after the migration.

9. The method according to claim 1, further comprising: suspending said VI at a stop-and-copy stage, and performing VM migration by synchronizing dirty pages in memory with one or more remote direct memory access (RDMA) operations.

10. A non-transitory computer-readable medium including instructions stored thereon for supporting virtual machine live migration in a host channel adapter (HCA) comprising an HCA microprocessor and an HCA memory and connected to a network, said HCA installed in a host computer comprising a host microprocessor and a host memory and a virtual machine (VM) operating on said host computer, which instructions, when executed, cause the HCA to perform steps comprising:
configuring the HCA to implement a virtual switch using said HCA microprocessor and HCA memory;
configuring the HCA to implement a plurality of virtual host channel adapters (vHCAs) associated with the virtual switch wherein each of the plurality of vHCAs is assigned a local identifier (LID) and provides a virtual interface (VI) having a separate VI namespace;
attaching a vHCA of said plurality of vHCAs to said VM operating on said host computer, wherein said vHCA provides a queue pair (QP) for communicating messages between said VM and a communication endpoint over said network, and wherein said QP is provided by the VI provided by said vHCA and uses the LID assigned to said vHCA as a communication attribute; and
wherein said HCA and vHCA are configured such that upon migrating said VM from said host computer to another host computer, said vHCA remains attached to said VM and continues to use said assigned LID after migration, such that said queue pair (QP) which uses said LID as a communication attribute continues to provide for communication of messages between said VM and said communication endpoint over said network after migration of said VM to said another host computer.

11. The non-transitory computer-readable medium according to claim 10, said steps further comprising: associating a plurality of QP attributes including said LID with said QP, wherein said QP attributes are reused after migration.

12. The non-transitory computer-readable medium according to claim 11, said steps further comprising: storing said plurality of QP attributes including said LID in memory regions accessible via an IO virtual memory that is translated by an input/output memory management unit (IOMMU).

13. The non-transitory computer-readable medium according to claim 10, said steps further comprising: suspending said vHCA into a suspend state that temporarily halts ongoing communication between said virtual machine and said communication endpoint to quiesce the QP during migration from said host to said another host.

14. The non-transitory computer-readable medium according to claim 10, wherein each of the plurality of vHCAs is associated with a virtual globally unique identifier (vGUID).

15. A system for supporting virtual machine live migration comprising:
a host computer comprising a host microprocessor and a host memory;
a host channel adapter (HCA) comprising an HCA microprocessor and an HCA memory and connected to a network, said HCA installed in said host computer;
a virtual machine (VM) operating on said host computer;
wherein said HCA is configured to perform steps comprising:
implementing a virtual switch using said HCA microprocessor and HCA memory;
implementing a plurality of virtual host channel adapters (vHCAs) associated with the virtual switch wherein each of the plurality of vHCAs is assigned a local identifier (LID) and provides a virtual interface (VI) having a separate VI namespace;
attaching a vHCA of said plurality of vHCAs to said VM operating on said host computer, wherein said vHCA provides a queue pair (QP) for communicating messages between said VM and a communication endpoint over said network, and wherein said QP is provided by the VI provided by said vHCA and uses the LID assigned to said vHCA as a communication attribute; and
wherein said HCA and vHCA are configured such that upon migrating said VM from said host computer to another host computer, said vHCA remains attached to said VM and continues to use said assigned LID after migration, such that said queue pair (QP) which uses said LID as a communication attribute continues to provide for communication of messages between said VM and said communication endpoint over said network after migration of said VM to said another host computer.

16. The system according to claim 15, wherein the HCA is further configured to associate a plurality of QP attributes including said LID with said QP, wherein said QP attributes are reused after migration.

17. The system according to claim 16, wherein the HCA is further configured to store said plurality of QP attributes including said LID in memory regions accessible via an IO virtual memory that is translated by an input/output memory management unit (IOMMU).

18. The system according to claim 15, wherein the HCA is further configured to suspend said vHCA into a suspend state that temporarily halts ongoing communication between said virtual machine and said communication endpoint to quiesce the QP during migration from said host to said another host.

19. The system according to claim 15, wherein each of the plurality of vHCAs is associated with a virtual globally unique identifier (vGUID).

20. The system according to claim 15, wherein the HCA is further configured to enable discovery of the plurality of vHCAs by a subnet manager operating on a switch in said network based on a LID and a vGUID associated with each of the plurality of vHCAs.

* * * * *